Oct. 29, 1929.  E. PIRON  1,733,750
DISTILLATION APPARATUS
Filed Dec. 3, 1926

Emil Piron  Inventor
By his Attorneys
Gifford & Scull

Patented Oct. 29, 1929

1,733,750

UNITED STATES PATENT OFFICE

EMIL PIRON, OF NEW YORK, N. Y.

DISTILLATION APPARATUS

Application filed December 3, 1926. Serial No. 152,325.

This invention relates to a device for distilling hydrocarbons or carbonaceous material in an oven, in which a metallic conveyor is used to support the material and transmit to it all or a part of the heat that is required for distillation. In devices of this sort where there is more or less destructive distillation or cracking of the material and distillation products taking place, great troubles are experienced because of the fact that carbon deposits on and adheres tenaciously to the metallic surface of the hot conveyor and especially on the surfaces through which heat is to be transmitted, either from the outside into the metal of the conveyor to heat it, or through the metal of the conveyor to the material to be distilled. The carbon deposit or coating on the metallic surface being a heat insulating material, it retards the transfer of heat. Therefore such carbon should be removed before a thick layer of the same forms. Attempts to destroy or remove the carbon coating from the surface of the conveyors by burning it, or by scraping it off with scrapers, or by breaking it with hammers, have not been entirely satisfactory.

By the present invention the metal conveyor upon which distillation takes place is so constructed that the carbon will be removed with certainty before a layer of sufficient thickness to cause serious trouble has become deposited, and the elements of the conveyor are moved in such a manner that the carbon is satisfactorily removed. In carrying out the invention, the conveyor consists of metallic elements pivoted together to form a chain, and so constructed that all the surfaces through which heat is to be transferred, or all the surfaces on which carbon deposit is apt to collect and should be avoided are formed of straight lines in the direction of their motion as they are carried along. The elements of the conveyor are caused to slide along over surfaces that contain straight lines in the direction of the motion of the conveyor, so that the carbon will be worn off by friction of the elements of the conveyor on the surfaces on which the conveyor elements slide.

The invention is especially applicable to an oven that has a chain of conveyor elements passing around sprockets and having upper and lower runs respectively. Both the top and bottom faces of the conveyor elements can be kept sufficiently free from carbon as one side of the elements can be caused to slide on the surfaces and have the carbon removed therefrom, while the elements on the upper run of the conveyor can have the carbon removed from the opposite surfaces when the elements are on the lower run of the conveyor.

Figure 1:
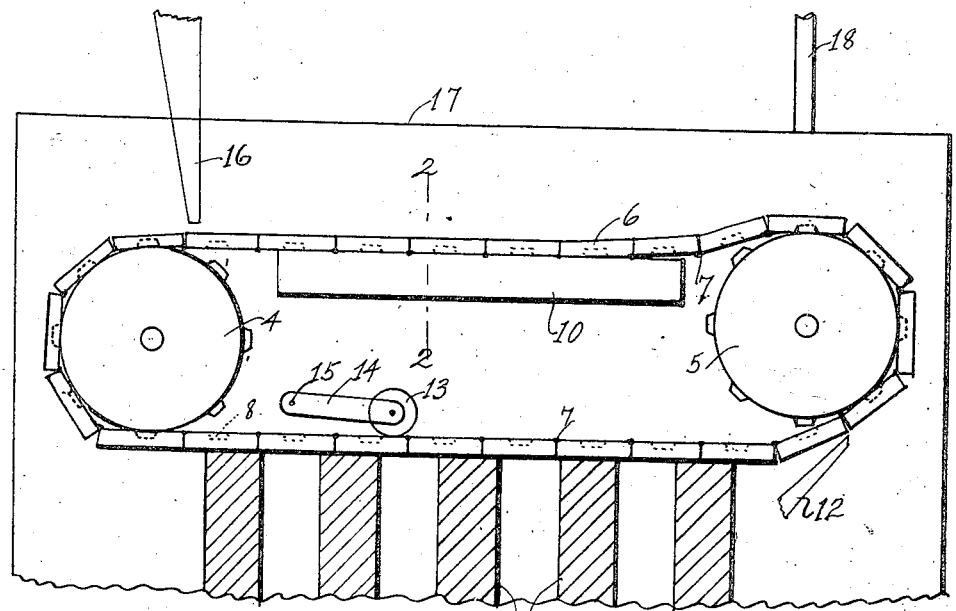
Figure 2:
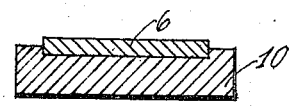

The invention will be more clearly understood from the description in connection with the accompanying drawings, in which Fig. 1 indicates a vertical section through an embodiment of the invention, and Fig. 2 is a section along the line 2—2 of Fig. 1.

In the drawings, reference characters 4 and 5 indicate sprocket rollers journaled in bearings, which may be adjustable. One or both of the sprockets may be driven by any convenient means, and a chain conveyor 6 that is made up of metallic elements passes around and is driven by the sprockets. The elements of the chain conveyor are made up of metal blocks hinged together, as indicated at 7, and provided with recesses 8 in which the teeth of the sprockets engage. The metallic blocks are made with the portions that are desired to be kept clean having straight lines in the direction of travel.

A fixed support 10 having an upper surface with lines corresponding to the straight lines on the lower side of the blocks along the upper run, is located so that the blocks slide upon this support and have whatever carbon that may have been deposited thereupon removed or worn off. Fixed supports 11 are spaced apart and have their upper ends formed to correspond to the lower side of the metal blocks along the lower run of the conveyor, and are located in such positions that the metal blocks will be drawn along the upper ends of these supports 11 and have whatever carbon that may be left thereon removed or worn off. The metal blocks of the conveyor have straight lines extending in the direction of translation of the blocks along the surfaces where carbon is apt to become deposited and is not wanted, and the fixed surfaces upon which the blocks slide are so shaped that the carbon will become removed or worn off on the metal blocks as they slide across the fixed surfaces. A fixed scraper or doctor 12 removes the easily removable portion of the carbon or coke and the remainder is removed as just described. One or more heavy rollers 13 may be pivoted at the outer ends of arms 14 that are pivoted to swing about the fixed point 15. These rollers 13 serve to press the blocks into more firm contact with the fixed supports 11 to aid in removing the adhering carbon in case the weight of the conveyor block is not sufficient to produce the desired wearing friction.

The conveyor may be heated by hot products of combustion contacting with the metal blocks in the spaces between the supports 11, and after the heated blocks have been carried around the sprocket roller 4, the hydrocarbons or carbonaceous materials to be distilled are fed to the top surface thereof through the chute or conduit 16 and become distilled as the blocks are carried toward the conveyor 5. The distillation device may be enclosed in a housing 17, if desired, through which a pipe 18 may lead for carrying away the volatile products of distillation. The coke or residue that is scraped off by the scraper 12 may be removed in any convenient manner.

It is obvious that instead of having the fixed support 10, a continuous support as indicated, it may be divided into several sections, the scraping surface of each section being made of such shape as to adapt it for removing the carbon as the blocks slide or are pulled across the same. Weights similar to the roller 13 may be used upon the upper run of the conveyor, if desired, in which case, longitudinal ribs could be provided along the upper surfaces of the blocks so that the rollers would contact with the ribs instead of contacting with the material that is being distilled.

I claim:

1. In a coal distilling apparatus, a distillation chamber, a conveyor comprising connected slabs or plates for conveying material into said chamber for distillation, said conveyor being adapted to discharge the residue of said material thereon after said material has been subjected to distillation, and means for scraping the surface of the slabs or plates of said conveyor to remove the residue remaining thereon after discharge.

2. In a coal distilling apparatus, a distillation chamber, a conveyor comprising connected slabs or plates provided with plane upper and lower faces, said conveyor comprising means for conducting coal deposited on the upper plane faces of said links through said distillation chamber and for dumping the residue from said coal after distillation and means for scraping said upper plane face prior to again depositing coal thereon.

3. In a coal distilling apparatus, a distillation chamber, a conveyor comprising connected slabs or plates provided with plane upper and lower faces, said conveyor comprising means for conducting coal deposited on the upper plane faces of said slabs or plates through said distillation chamber and for dumping the residue from said coal after distillation, means for scraping the upper plane face of each slab or plate prior to again depositing coal thereon and means for scraping the lower plane face of each of said slabs or plates.

4. In a coal distilling apparatus, a distilling zone and a heating zone, a conveyor comprising an endless series of connected slabs or plates traversing said heating zone, said conveyor being adapted to convey coal deposited on each of said slabs or plates into said distilling zone, and means for scraping the coal carrying faces of said slabs or plates during their passage past said heating zone.

5. In a coal distilling apparatus, a heating zone including flues for gases of combustion and a distilling zone, a conveyor comprising an endless chain of slabs or plates, the slabs or plates of said conveyor alternately traversing said heating zone and said distillation zone, means for depositing coal on said slabs or plates after passage of said slabs or plates through the heating zone for transportation through said distilling zone, said conveyor being adapted to dump the residue of said coal upon leaving the distilling zone, the coal carrying faces of each slab or plate being adapted to drag over the flues of said heating zone whereby any residue remaining on the coal carrying faces of said slabs or plates is scraped off or worn away.

6. In a coal distilling apparatus, a heating zone and a distilling zone, a conveyor comprising an endless chain of connected slabs or plates traversing said zones, means for depositing coal on each of said slabs or plates, after heating for transportation through said distilling zone, each of said slabs or plates being adapted to dump the residue of said coal after distillation, a support for said conveyor in said distilling zone, the face of each of said slabs or plates being adapted to drag over said support whereby any carbon thereon is frictionally removed and means for scraping any residue remaining on the coal carrying faces of said slabs or plates after said dumping action and prior to again depositing coal thereon.

7. In a coal distilling apparatus, a distilling zone and a heating zone, an endless conveyor comprising connected slabs or plates, rotation of said conveyor alternately causing each of said slabs or plates to traverse said heating zone and said distilling zone, means for depositing coal on each of said slabs or plates after said slab or plate has traversed the heating zone for transportation through said distilling zone, means for scraping the coal carrying face of each of said slabs or plates prior to again traversing the heating zone and means for scraping said coal carrying faces during traversal of said heating zone.

8. In a coal distilling apparatus, a furnace including a heating zone and a distilling zone, said heating zone comprising flues having plane tops, said distilling zone comprising a portion of the interior of said furnace above the tops of said flues, an endless conveyor comprising connected slabs or plates having plane upper and lower faces rotating over sprockets in said distilling zone, and a fixed support in said distilling zone for supporting the upper flight of said conveyor between sprockets, the lower flight of said conveyor being supported by the tops of said flues, said fixed support acting as a scraper for one face of each of said slabs or plates, the tops of said flues acting as a scraper for the other face of each of said slabs or plates whereby the surfaces of the slabs or plates are intermittently cleansed of extraneous matter thereon.

9. In a coal distilling apparatus, a furnace including a heating zone and a distilling zone, said heating zone comprising flues having plane tops, said distilling zone comprising a portion of the interior of said furnace above the tops of said flues, an endless conveyor comprising connected slabs or plates having plane upper and lower faces rotating over sprockets in said distilling zone, and a fixed support in said distilling zone for supporting the upper flight of said conveyor between sprockets, the lower flight of said conveyor being supported by the tops of said flues, said fixed support acting as a scraper for one face of each of said slabs or plates, the tops of said flues acting as a scraper for the other face of each of said slabs or plates whereby the surfaces of the slabs or plates are intermittently cleansed of extraneous matter thereon, and a mechanical scraper for the coal carrying surfaces of said slabs or plates located between said fixed support and the tops of said flues.

10. In a coal distilling apparatus, a furnace including a distilling zone and a heating zone, said heating zone including substantially vertical flues having flat tops, said distilling zone comprising a portion of the interior of said furnace above said flues, an endless conveyor in said distilling zone comprising connected blocks having flat upper and lower faces supported on rotating sprockets, a fixed support in the wall of said furnace for supporting the upper flight of said conveyor, said support likewise acting as a scraper for the contacting faces of said blocks, the flat tops of said flues comprising supports for the lower flight of said conveyor and means for pressing the blocks of said lower flight against the tops of said flues whereby the friction therebetween is increased in order to wear off all extraneous matter on the coal carrying faces of said blocks.

11. In a coal distilling apparatus, a furnace including a distilling zone and a heating zone, said heating zone comprising substantially vertical flues having flat tops, said distilling zone including a portion of the interior of said furnace above said flues, an endless conveyor above said flues comprising connected blocks having flat coal carrying surfaces rotatable over spaced sprockets, the lower flight of said conveyor overlying said flues, means for introducing coal to said blocks for transportation through said distilling zone, said blocks being adapted to dump the residue of said coal after distillation and rolling means for pressing the blocks of said lower flight against the tops of said flues whereby the friction therebetween is increased to scrape all extraneous matter from the coal carrying faces of said blocks.

12. In a coal distilling apparatus, a furnace including a distilling zone and a heating zone, said heating zone comprising substantially vertical flues having flat tops, said distilling zone including a portion of the interior of said furnace above said flues, an endless conveyor above said flues comprising connected blocks having flat coal carrying surfaces rotatable over spaced sprockets, the lower flight of said conveyor overlying said flues, means for introducing coal to said blocks for transportation through said distilling zone, said blocks being adapted to dump the residue of said coal after distillation, a scraper for cleansing the coal carrying faces of said blocks, and a roller for urging said blocks against the top of said flues to increase the friction therebetween to wear away all extraneous matter on the coal carrying faces of said blocks.

EMIL PIRON.